United States Patent
McRory

(10) Patent No.: US 9,593,843 B2
(45) Date of Patent: Mar. 14, 2017

(54) CONCEALED SURVEILLANCE CAMERA SYSTEM FOR LIGHTING DEVICES

(71) Applicant: Knuckledragger Design, Inc., Spring Valley, CA (US)

(72) Inventor: Michael P. McRory, Spring Valley, CA (US)

(73) Assignee: Knuckledragger Design, Inc., Spring Valley, CA (US)

( * ) Notice: Subject to any disclaimer, the term of this patent is extended or adjusted under 35 U.S.C. 154(b) by 311 days.

(21) Appl. No.: 14/525,005

(22) Filed: Oct. 27, 2014

(65) Prior Publication Data
US 2015/0124100 A1 May 7, 2015

Related U.S. Application Data

(60) Provisional application No. 61/899,397, filed on Nov. 4, 2013.

(51) Int. Cl.
*H04N 9/47* (2006.01)
*F21V 33/00* (2006.01)
(Continued)

(52) U.S. Cl.
CPC .......... *F21V 33/0076* (2013.01); *F21S 8/085* (2013.01); *F21V 33/0052* (2013.01);
(Continued)

(58) Field of Classification Search
CPC ......... F21S 10/002; F21S 8/085; F21V 14/02; F21V 21/30; F21V 33/0052;
(Continued)

(56) References Cited

U.S. PATENT DOCUMENTS 6,160,353 A * 12/2000 Mancuso ............ F21V 21/0824
250/205
6,948,826 B2 9/2005 Fogerlie
(Continued)

FOREIGN PATENT DOCUMENTS

KR 2013019598 2/2013

OTHER PUBLICATIONS http://www.smarthome.com/SmartGuard-AEC-931A2BSD-Motion-Sensor-Twin-Light-with-Security-Camera/p.aspx, printed Sep. 4, 2013.

(Continued)

*Primary Examiner* — Sath V Perungavoor
*Assistant Examiner* — Puneet Dhillon
(74) *Attorney, Agent, or Firm* — Procopio, Cory, Hargreaves & Savitch, LLP

(57) ABSTRACT

A combined concealed surveillance camera and photosensor control system is contained in an outer housing of predetermined configuration and dimensions to replace the existing light sensor or photosensor control unit of a public, commercial, or residential lighting fixture, replacing the function of the existing control unit in turning the lighting fixture on and off based on detected ambient light level, and also providing a concealed surveillance camera system drawing power from the lighting fixture power supply so that the camera is on continuously while the lighting fixture is turned on and off based on the detected ambient light level.

20 Claims, 8 Drawing Sheets

(51) Int. Cl.
*H04N 5/225* (2006.01)
*F21S 8/08* (2006.01)
*H04N 7/18* (2006.01)

(52) U.S. Cl.
CPC ......... *H04N 5/2251* (2013.01); *H04N 5/2256* (2013.01); *H04N 5/2257* (2013.01); *H04N 7/185* (2013.01)

(58) Field of Classification Search
CPC  F21V 33/0076; H04N 5/2256; H04N 5/2251; H04N 7/185; H04N 5/2257; H04N 7/18
USPC .............. 348/142, 151, 373; 362/2; 396/155
See application file for complete search history.

(56) References Cited

U.S. PATENT DOCUMENTS

| | | | |
|---|---|---|---|
| 7,500,794 B1 | 3/2009 | Clark | |
| 8,249,444 B2 | 8/2012 | Peterson et al. | |
| 8,711,216 B2* | 4/2014 | Chien | F21S 4/28 348/142 |
| 2008/0191897 A1* | 8/2008 | McCollough | G08B 21/12 340/3.1 |
| 2008/0224849 A1 | 9/2008 | Sirhan | |
| 2009/0027498 A1 | 1/2009 | Owen et al. | |
| 2009/0237509 A1 | 9/2009 | Saxon | |
| 2011/0102587 A1 | 5/2011 | Zittel | |
| 2012/0081547 A1 | 4/2012 | Sitzmann et al. | |
| 2012/0113646 A1 | 5/2012 | Carmody | |
| 2012/0218421 A1 | 8/2012 | Chien | |
| 2013/0130522 A1* | 5/2013 | Mitchell | H01R 13/6397 439/133 |
| 2014/0009632 A1* | 1/2014 | Glover | H04N 5/232 348/211.99 |
| 2014/0313343 A1* | 10/2014 | Frank | H04N 5/33 348/164 |

OTHER PUBLICATIONS http://www.amazon.com/Advance-SSC-771C3H-Outdoor-Motion-Light/dp/B005D9HRRW, printed Aug. 28, 2013.
http://www.samsclub.com/sams/smartguard-motion-light-w-security-camera/1772776.ip, printed Aug. 28, 2013.
Outdoor Motion Sensor Security Light CVC-340LC/W made by Speco Technologies, Advertisement printed Aug. 2013.

* cited by examiner

CONCEALED SURVEILLANCE CAMERA SYSTEM FOR LIGHTING DEVICES

FIELD OF THE INVENTION

The present invention relates generally to lighting devices or fixtures controlled by light sensors or photosensors, and is particularly concerned with a concealed surveillance camera system for such lighting devices.

BACKGROUND OF THE INVENTION

Many surveillance camera systems are pole mounted in public spaces, for example on existing street lights, area lights, or traffic light poles. Existing public lighting infrastructure is used in order to provide a good vantage point and available power to install the surveillance systems. It is often difficult to find an appropriate location for such surveillance systems, and concealment is difficult or impossible. In most cases, the cameras are mounted to an existing light fixture pole or housing and powered from the same source as the light fixtures. The same is true of surveillance camera systems used on commercial or residential photosensor operated light fixtures. This typically involves mounting of a large and obtrusive camera system on the pole or other light fixture support, and connecting the system to the existing power source, resulting in lack of concealment and extra installation time. Other solutions require modification of the existing light fixture or removal and replacement of the entire lighting fixture with a new lighting fixture which has an integrated camera system. This also involves a large amount of installation time as well as expense.

SUMMARY OF THE INVENTION

Embodiments described herein provide a combined surveillance camera and photosensor system designed as a module or unit which can replace the existing light sensor or photosensor control unit of an existing public, commercial, or residential lighting fixture, replacing the function of the existing light sensor in turning the lighting fixture on and off based on ambient light level, while providing a concealed surveillance camera system drawing power from the existing photo control sensor power supply.

In one embodiment, a combined surveillance and photosensor system is mounted in a housing which has a base portion which is of shape, dimensions, and configuration matching that of a twist lock base of a photosensor housing or unit on an existing lighting fixture. Typically, existing photosensor units are designed for engagement in a recess or seat on a lighting fixture via a twist lock base or the like, with a twist lock electrical and mechanical connection on the bottom of the twist lock base for connecting to an enclosed photosensor which controls switching on and off of the light fixture depending on the surrounding ambient light detected by the photosensor. The combined surveillance camera and photosensor system in one embodiment has an enclosure or housing with a base portion of shape and dimensions substantially matching those of the existing light fixture photosensor housing. A twist lock base on the base portion has an electrical and mechanical connection matching that of the existing photosensor unit. Thus, the surveillance system simply replaces the light sensor unit already installed in the lighting fixture, requiring no separate mounting on a light pole and no modification of the existing lighting fixture. In one embodiment the housing has a first part including the base portion and a second part rotatably mounted on the first part in which the camera unit is mounted. The second part has a window aligned with a camera inside the housing. In one embodiment, the second part is rotatably mounted on the first part for a 360° scan of the area, and the camera may also have a tilt mechanism for further expansion of the field of view.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Embodiments described herein provide for a surveillance camera system integrated with a photosensor or light sensor unit for activating a public, commercial or residential lighting device or fixture and designed to replace the existing photo sensor unit for activating the light, such that the existing light fixture requires no modification and the presence of a surveillance camera is concealed, and the components of the camera system can use the existing light fixture's power supply for power. Although the surveillance camera system or unit in the illustrated embodiments is shown for attachment to a cobra head style lighting fixture, it will be understood that the unit may alternatively be designed for mounting or attachment to any commercial, public or residential light fixture which uses a similar photosensor unit for actuating the light. The existing photosensor unit of any such light fixtures can simply be replaced by the surveillance camera system with an integrated photosensor.

Figure 1:
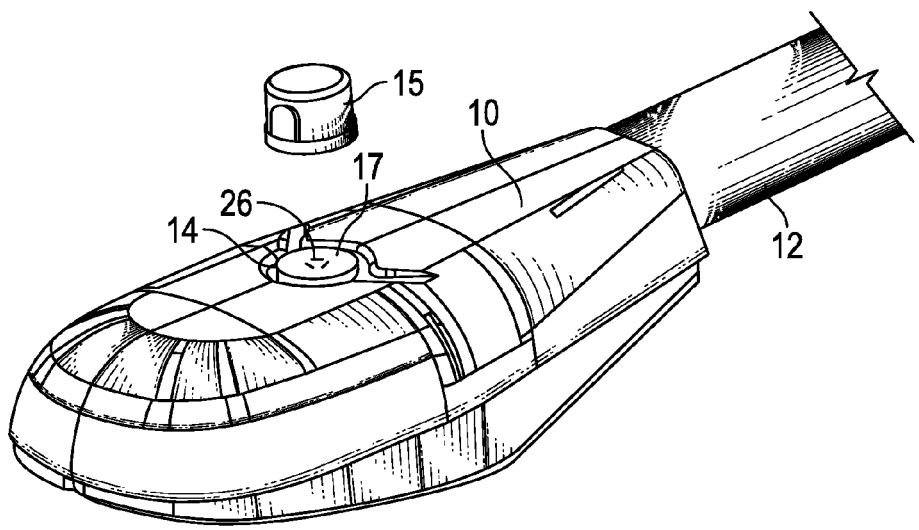
FIG. 1 is a perspective view of a prior art pole-mounted public lighting fixture including a light sensor unit for actuating the light, with the standard light sensor unit shown separately above its mounting recess.
Figure 2:
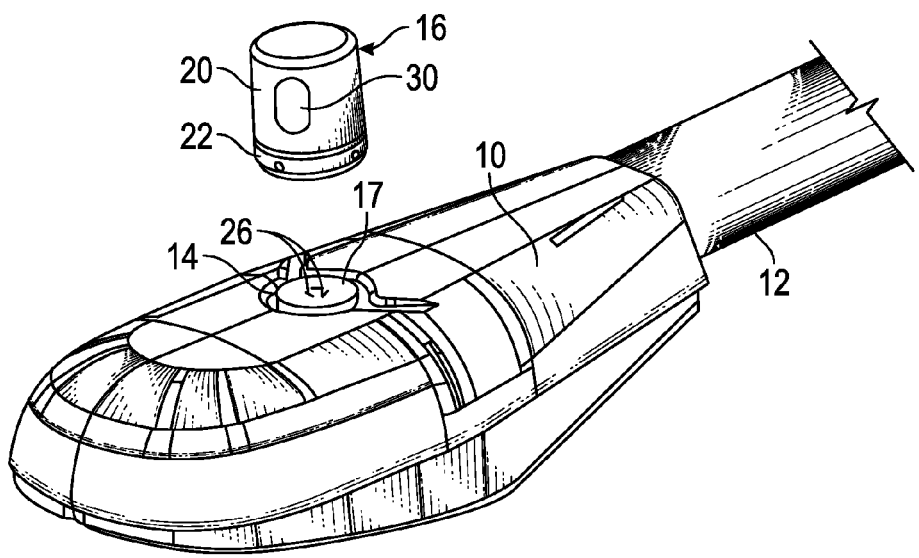
FIG. 2 is a perspective view of the same lighting fixture but with the standard light sensor unit replaced by one embodiment of a combined surveillance camera and photosensor system or unit, with the replacement unit also shown separately and above the photosensor mounting recess.

FIG. 1 illustrates one type of conventional cobra head style, pole mounted street light 10 mounted on a pole 12. Such lighting fixtures typically have a recess or seat 14 in the housing 10 designed to receive a removable light sensor or photosensor unit 15 via a twist lock connector on the base of the unit. The unit 15 is installed by pushing it into the recess while twisting to engage the twist lock mechanical and electrical connection 17 in the base of recess 14, and removed by twisting in the opposite direction while pulling the unit out of the recess. Photosensor unit 15 controls connection of the power supply to the light so that the light is turned on under dark conditions, i.e. when the detected ambient light falls below a predetermined level. Similar photosensor units are releasably mounted in many other types of public and private light fixtures.

Figure 3:
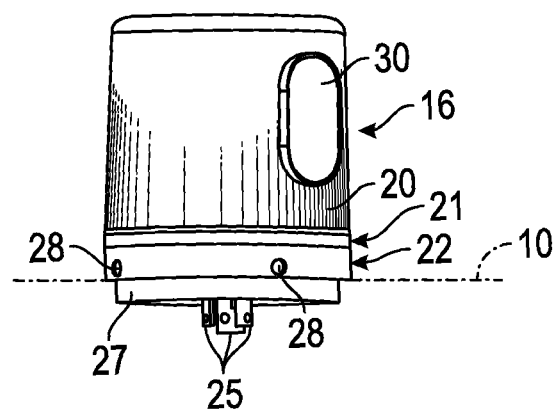
FIG. 3 is a front elevation view of the surveillance camera and light sensor unit of FIG. 2.
Figure 4:
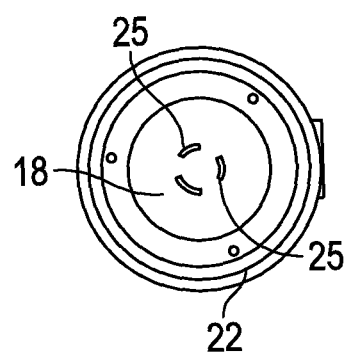
FIG. 4 is a bottom plan view of the surveillance camera and light sensor unit of FIG. 3 illustrating the twist lock base and contacts.

FIGS. 2 to 5 illustrate one embodiment of a combined photosensor and concealed surveillance camera system or unit 16. The components of the system are enclosed in an outer housing having a first part 22 and a second part or top cap 20 rotatably mounted on the first part 22 via rotary joint 21 having a rotary joint bearing 23 and bearing retainer 24. The first part 22 has a twist lock base which is designed to substantially match the twist lock base of the existing photosensor unit 15 which the unit is intended to replace. As seen in FIGS. 3 and 4, the end face 18 of the portion 27 of the base designed to engage in recess 14 has three projecting contacts 25 which are positioned for engagement in corresponding contact slots 26 in the mounting recess 14. In the illustrated embodiment, contacts 25, 26 are mating pin and socket contacts, but could be of other contacting or mating configurations in alternative embodiments. The diameter of base 22 substantially matches the diameter of the twist lock base of a previously installed photosensor unit 15 so that the portion 27 fits into recess or seat 14. In one embodiment the housing diameter was approximately 3.75 inches. It will be understood that this dimension may be varied for different types of lighting fixture having different size photosensor units. Combined photosensor and surveillance camera unit 16 has a height greater than the height of the photosensor unit 15 it is to replace, due to the additional space requirements of the camera unit and the viewing window, and in one embodiment the height of the housing is around 1.4 inches. Once installed, the housing projects out of the seating recess of light 10 as seen in FIG. 3.

Figure 5:
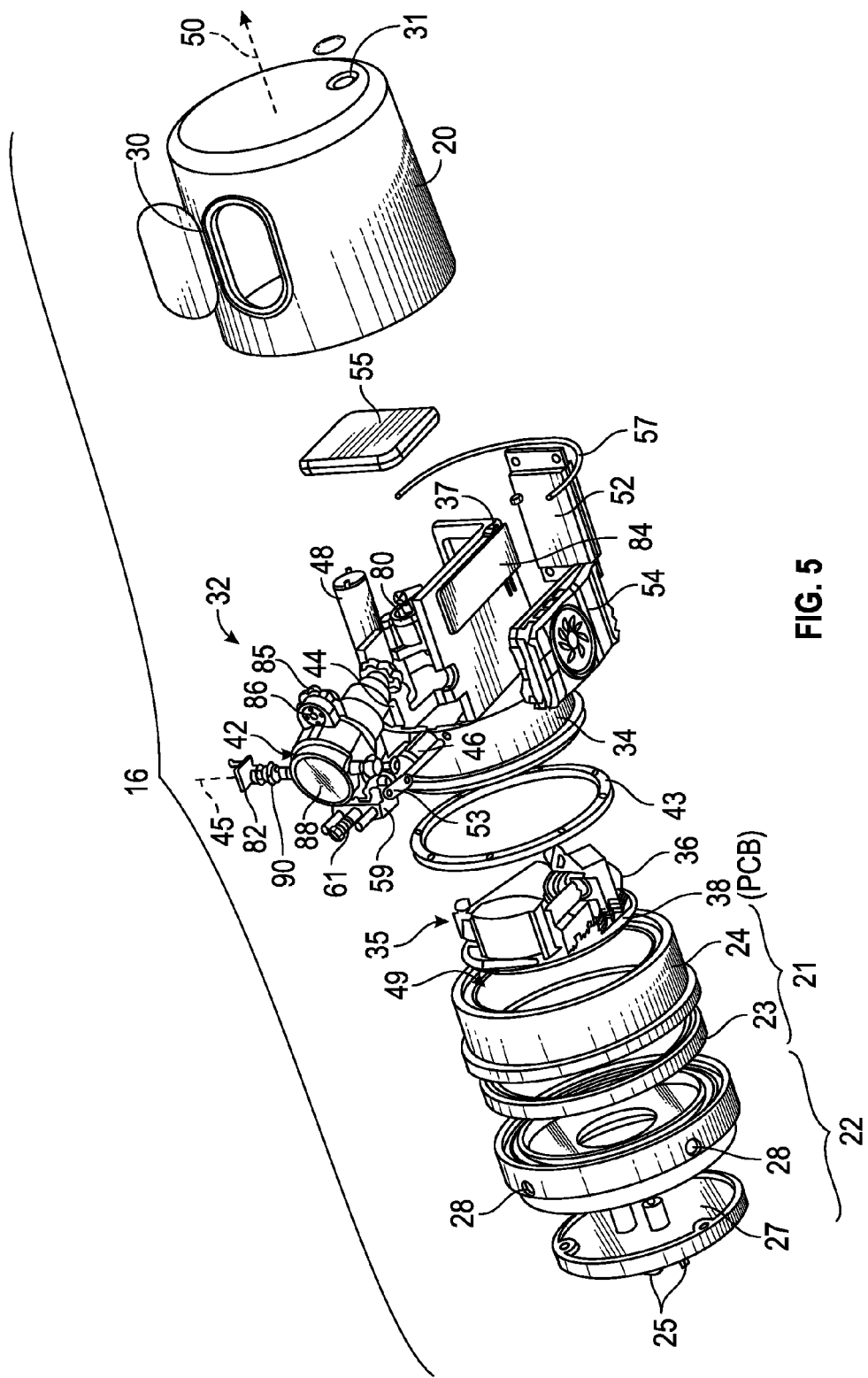
FIG. 5 is an exploded perspective view of one embodiment of the combined surveillance camera and light sensor unit of FIGS. 2 to 4.

Components of one embodiment of the integrated surveillance camera system and photosensor unit are illustrated in the exploded view of FIG. 5. These components are enclosed within the housing when the parts are assembled as in FIGS. 2 to 4. As best illustrated in FIGS. 3 and 5, the first part 22 of the housing has four photosensor windows 28 which are positioned at equal spacings around the periphery of base 22, and the rotatable second part or top cap 20 has a single, relatively large camera viewing window 30 to allow for tilting of the camera to scan up and down. A second, small photocell viewing window 31 is provided in the upper wall of top cap. In one embodiment, the system 16 basically comprises a camera or imaging device module 32 which is mounted on base or camera bracket 34 secured inside cap 20 so that the camera module rotates with the cap, and a photosensor module or power switching assembly 35 on base 38 mounted in the first part 22 of the housing between the twist lock base 27 and the camera module 32. When the twist lock base is 27 secured in a photosensor recess of a light fixture as in FIG. 2, the photosensor module 35 remains stationary while the camera module 32 rotates to pan the surrounding area. The photosensor module 35 is different from prior art photosensor module 15 since it has four equally spaced photosensors 36 rather than one. In one embodiment, a top photocell 37 or photosensor located at the top of camera module 32 and is aligned with photocell viewing window 31 in the top cap when the parts are assembled as in FIGS. 2 and 3. The combined outputs of the five photosensors in this embodiment help in determining current ambient light level, as described in more detail below.

Figure 6:
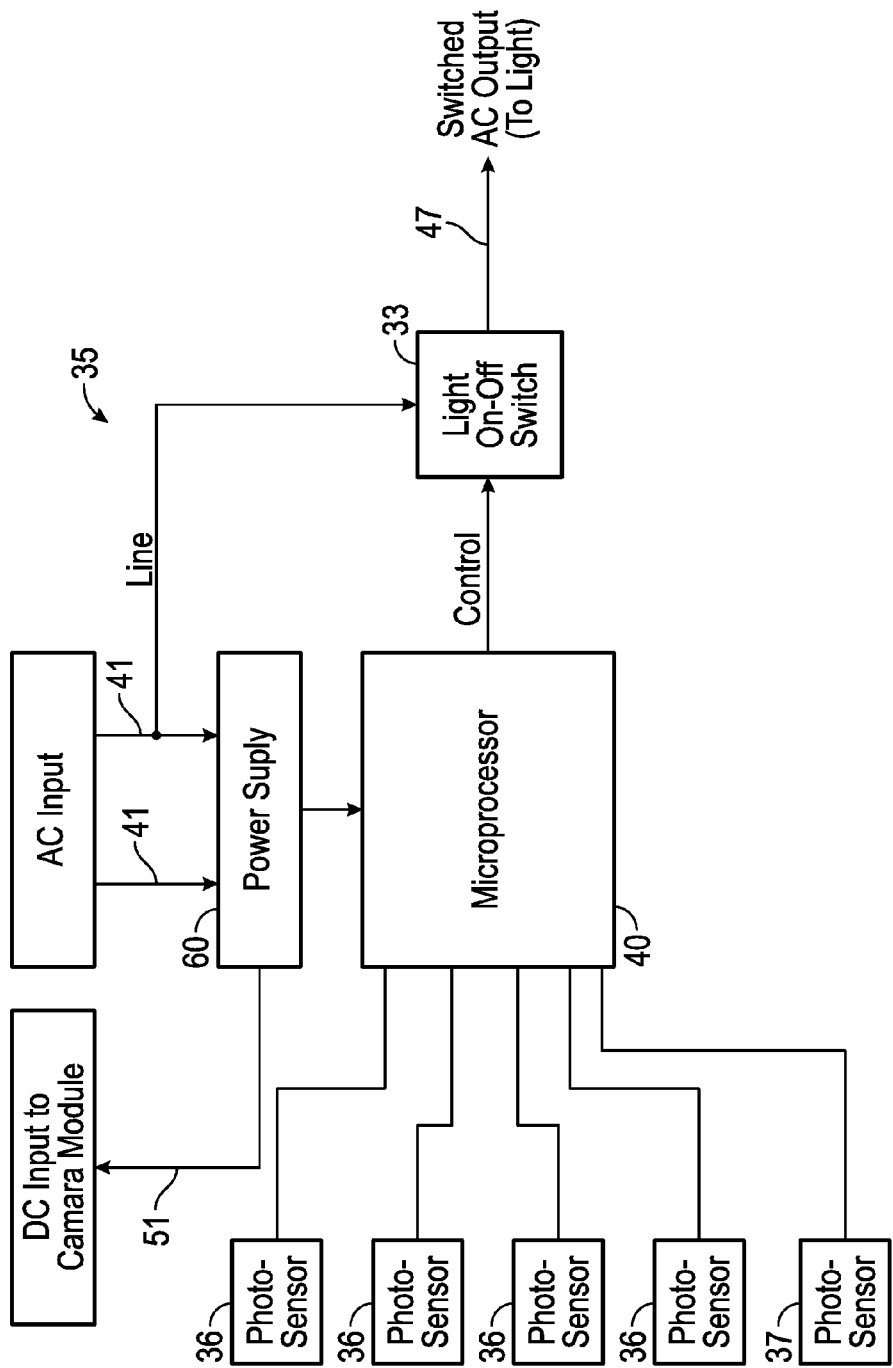
FIG. 6 is a block diagram of one embodiment of the photosensor control module of FIG. 5.

FIG. 6 is a block diagram of photosensor module 35. As illustrated in FIG. 5, the photosensors 36 are mounted around the periphery of printed circuit board 38 and positioned for alignment with respective windows 28 on the twist lock base 22, and have outputs connected to microprocessor 40 as illustrated in FIG. 6. In one embodiment, microprocessor 40 is programmed to combine and compare the output light amplitude from the four photosensors in order to determine average ambient light level, and controls a switch 33 in order to connect the existing AC power supply to the light in fixture 10 via contacts 25 when the detected ambient light level is below a predetermined minimum level. As illustrated in FIG. 6, the three contacts or pins 25 comprise AC inputs 41 which connect to the lighting fixture AC power input, and a switched AC output 47 which is connected to the light source in fixture 10. Inputs 41 are also connected via AC-DC converter or power supply 60 to the camera module DC input 51 (also shown in FIG. 7) via a slip ring or rotary electrical contact 49 inside rotary joint 21, so that power is supplied to the camera components at all times while unit 16 is secured in recess 14. Power supply 60 may alternatively be located in the surveillance camera unit 32 or a battery power supply may be provided. The light on-off switch 33 which is controlled by microprocessor 40 controls the AC output 47 to turn the light in lighting fixture 10 on when the detected ambient light from the photosensors is below a predetermined level, and to switch off the light when the detected ambient light is above a predetermined level.

Top photocell or photosensor 37 may be used in addition to photosensors 36 to provide a more accurate reading of ambient light level, or photosensors 36 may be eliminated in alternative embodiments with only photocell 37 used to sense the light level. Photocell 37 in the outer part or top cap 20 of the housing may also be connected to the photosensor module via the slip ring 49. Photocell 37 is directed through clear window 31 in the top of the cap 20 and rotates with the top cap along with the camera module 32. Window 31 may also be provided on the outer cylindrical wall of top cap 20. This may be helpful where snow builds up on the light 10, potentially blocking the lower photosensor windows 28.

The surveillance camera or imaging device module 32 of FIG. 5 will now be described in more detail. The camera mounting bracket or base 34 is rotatably mounted on bearing retainer 24 in the base of unit 16 via azimuth gear ring 43 which is secured to bearing retainer 24. In the illustrated embodiment, camera 42 faces window 30 and is a remotely positioned, microwave transmission dual head camera using a digital transmitter 54. Other types of surveillance cameras may be used in alternative embodiments, including single head cameras. Camera 42 is pivotally mounted by elevation tilt arm 53 between mounting plates 44 on the camera mounting bracket or base for rotation about tilt pivot axis 45. The elevation tilt arm 53 is driven by a slider block 59 which is connected to elevation drive motor 46 via a lead screw 61. This controls the tilt of camera 42 so that the camera can be panned up and down through window 30. Both of the camera heads and the associated optics move in unison and pivot on tilt bearings 90 to tilt up and down for viewing at different tilt angles through window 30. Azimuth motor 48 controls the rotation of the camera module 32 and the upper part 20 of the housing about central axis 50 (pan) through a spur gear (not visible in the drawing) meshing with the fixed azimuth ring gear when the parts are assembled as in FIGS. 2 and 3. Surveillance camera module 32 in this embodiment also comprises a telemetry receiver 52 for receiving camera control signals via receive antenna 57 from a remote monitoring location, digital transmitter 54, and transmit antenna 55 for transmitting images from camera 42 to the remote monitoring location. An azimuth position sensor 80 is driven by a gear which meshes with the azimuth ring gear 43 and monitors azimuth position of the camera, and elevation position sensor 82 mounted on the elevation tilt axis monitors the tilt of camera 42. A servo board 84 carries microprocessor 40 as well as servo drive 89 which is used to drive the two motors 46, 48 and receives position data from the feedback sensors 80, 82, as illustrated in FIGS. 7A and 8.

The height of window 30 is arranged so that the camera 42 can scan or tilt up and down through a predetermined viewing angle. The camera module may comprise an off-the-shelf surveillance camera with built-in pan-tilt adjustment, or may be custom made for this system. In the embodiment illustrated in FIGS. 5 and 7A, the camera 42 is a dual head camera comprising a first imaging device or camera head 85 with a fixed, wide angle field of view lens 86, and a second imaging device or camera head 87 with a fixed, narrow field of view lens 88. Both cameras move in unison as controlled by the pan and tilt mechanism via the telemetry link.

The two camera heads move together in unison and are utilized with narrow and wide field of view fixed lenses to provide good overall view of the scene plus a narrower more detailed image of an area of interest. High definition digital wireless video transmitter 54 may be used to send the video images to the remote terminal. A user at the remote terminal can control the position of the cameras in azimuth and elevation remotely through the telemetry link. The telemetry receiver 52 passes received commands to the servo board 84 which interprets the commands and sends motor drive signals to the custom pan tilt assembly. The pan tilt assembly has feedback devices that allow the user to save and recall preset positions. All of the components above the main bearing rotate along with the azimuth drive motor.

Figure 7A:
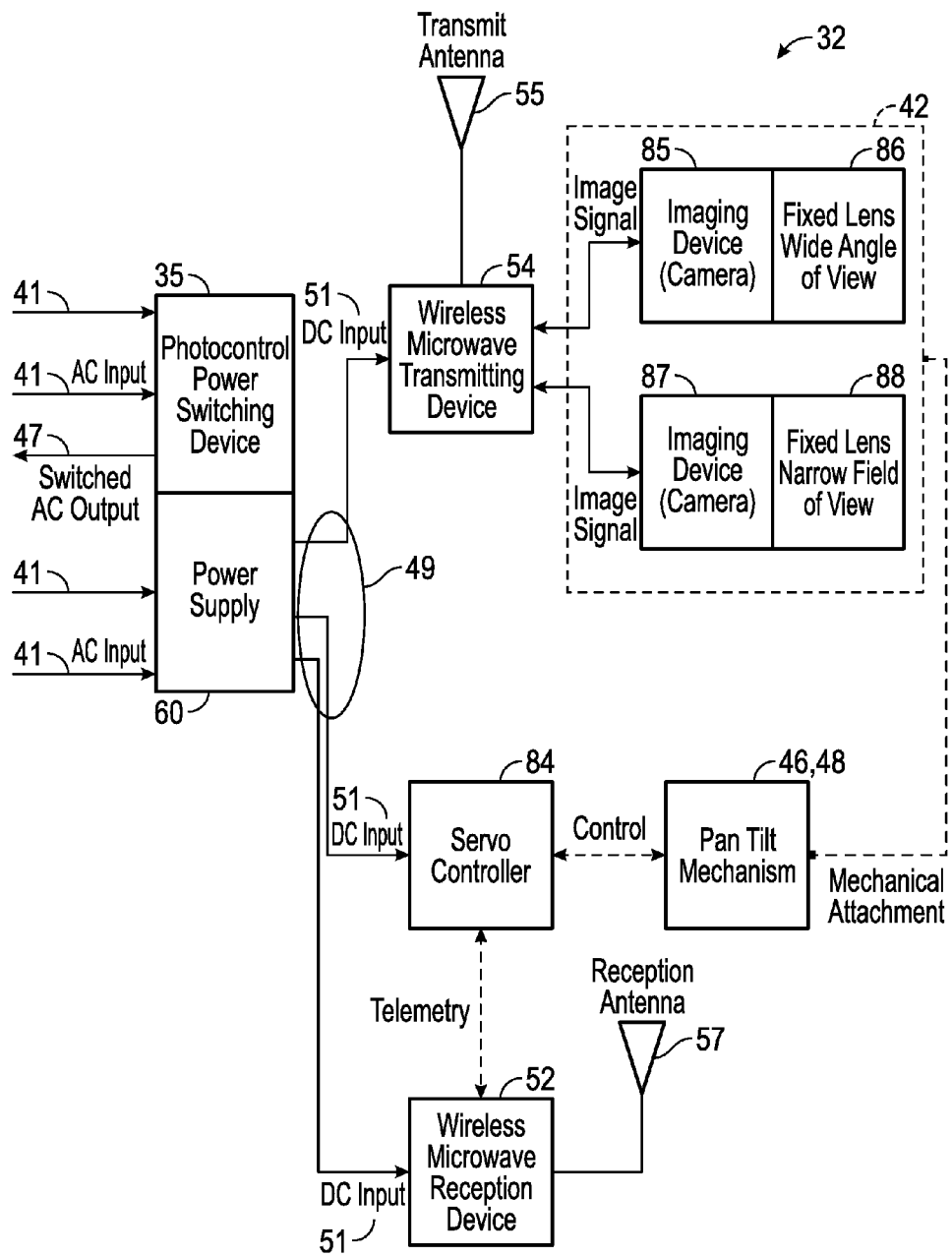
FIG. 7A is a block diagram of the combined surveillance camera and photosensor system of FIGS. 2 to 5.
Figure 8:
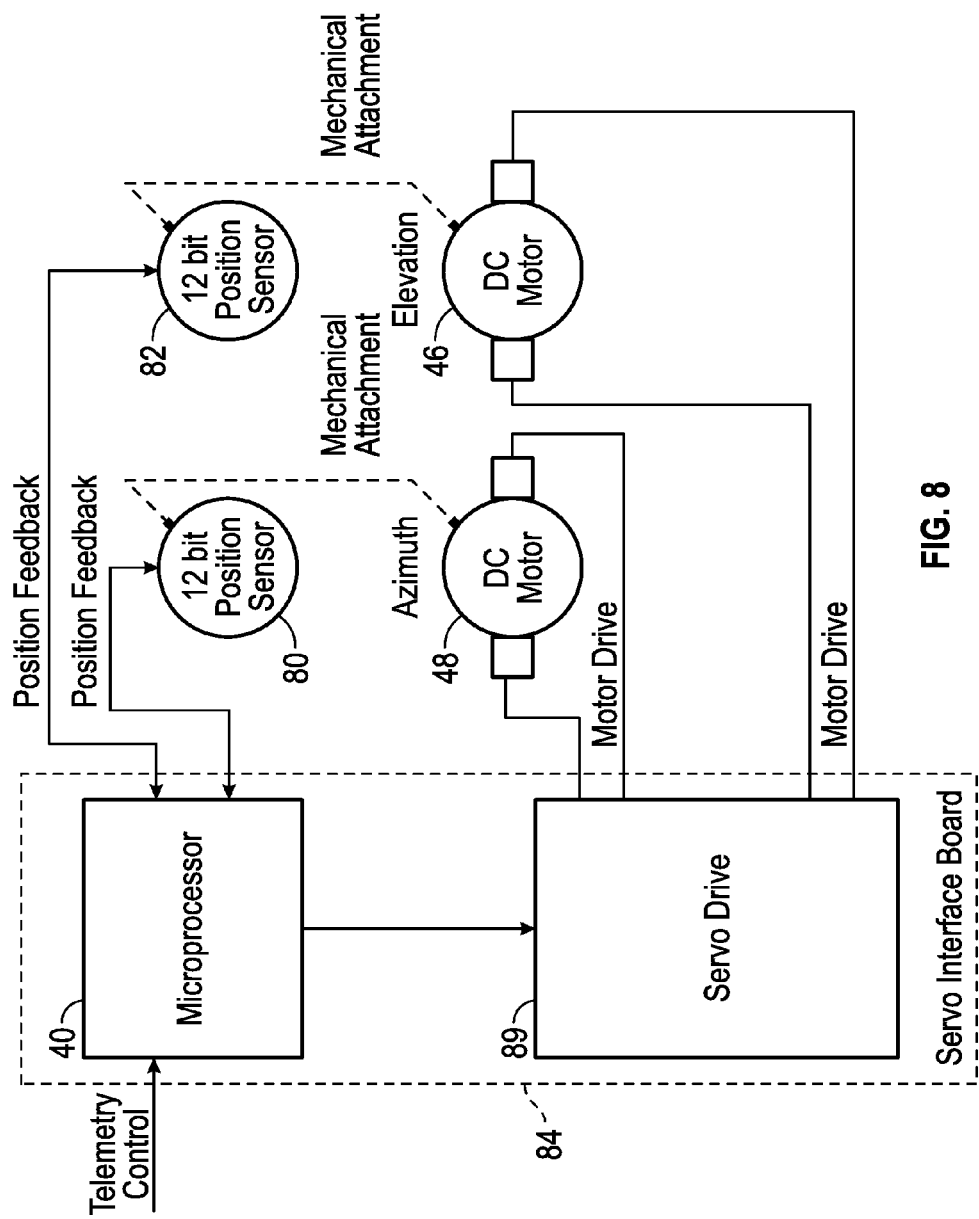
FIG. 8 is a block diagram illustrating the servo drive and position feedback system of FIGS. 5 and 7A in more detail.

FIG. 7A is a block diagram of the system of FIG. 5. The AC input 41 communicates with the power supply 60 and light on off switch 33 (FIG. 6). The servo controller or board 84 carries microprocessor 40 and servo drive 89 (FIG. 8) which draw power from the power supply 60 and provide a control signal to the light on off switch which is connected to AC line 41. The surveillance system will draw power from the power supply 60 to power all related devices. The AC inputs 41 of FIG. 6 are connected via the microprocessor 40 of the photocontrol power switching assembly or module 35 to AC-DC converter or power supply 60 which supplies DC input 51 to the camera 42, the pan/tilt mechanism (elevation and azimuth control motors 46, 48), and wireless transceiving device 52, 54, with all electrical communication between rotating and non-rotating parts provided by a conductive slip ring 49 inside rotary joint 21. Servo controller 84 of the wireless transceiver assembly controls pan and tilt of the camera 42 via motors 48, 46 based on input signals from a remote operator via microwave receiver 52. Thus, an operator at a remote location viewing the output of camera 42 can remotely position and control the camera and lens wirelessly, adjusting pan and tilt of the camera to position the camera to track items of interest and switching between the dual camera heads for a wide or narrow field of view. The image signal is transmitted to a remote monitoring location via wireless transmitter 54 and antenna 55.

FIG. 8 is a block diagram illustrating the servo drive and position feedback system of FIGS. 5 and 7A in more detail. As illustrated in FIG. 8, sensors 80, 82 in one embodiment are twelve bit position feedback sensors which are mechanically coupled to each rotation axis to provide position feedback for the mechanism and absolute position information at all times, which can be saved by the user to recall preset positions as needed. The azimuth position sensor 80 is drive by a gear which meshes with the azimuth ring gear 43. Microprocessor 40 and servo drive or controller 89 are mounted on a servo interface board 84 (FIG. 5), and are used to drive the two motors 46, 48 and receive position data from the feedback sensors. The control signals generated by the telemetry receiver or bidirectional microwave link are received by the microprocessor 40 on the servo board. The microprocessor interprets the commands and provides control signals for the servo drive section 89 of the board to control drive to the motors. The position feedback is used to allow the user to save and recall preset positions as needed. The position feedback also allows for tracking control using more sophisticated software packages designed to allow a user to automatically track a target of interest.

Figure 7B:
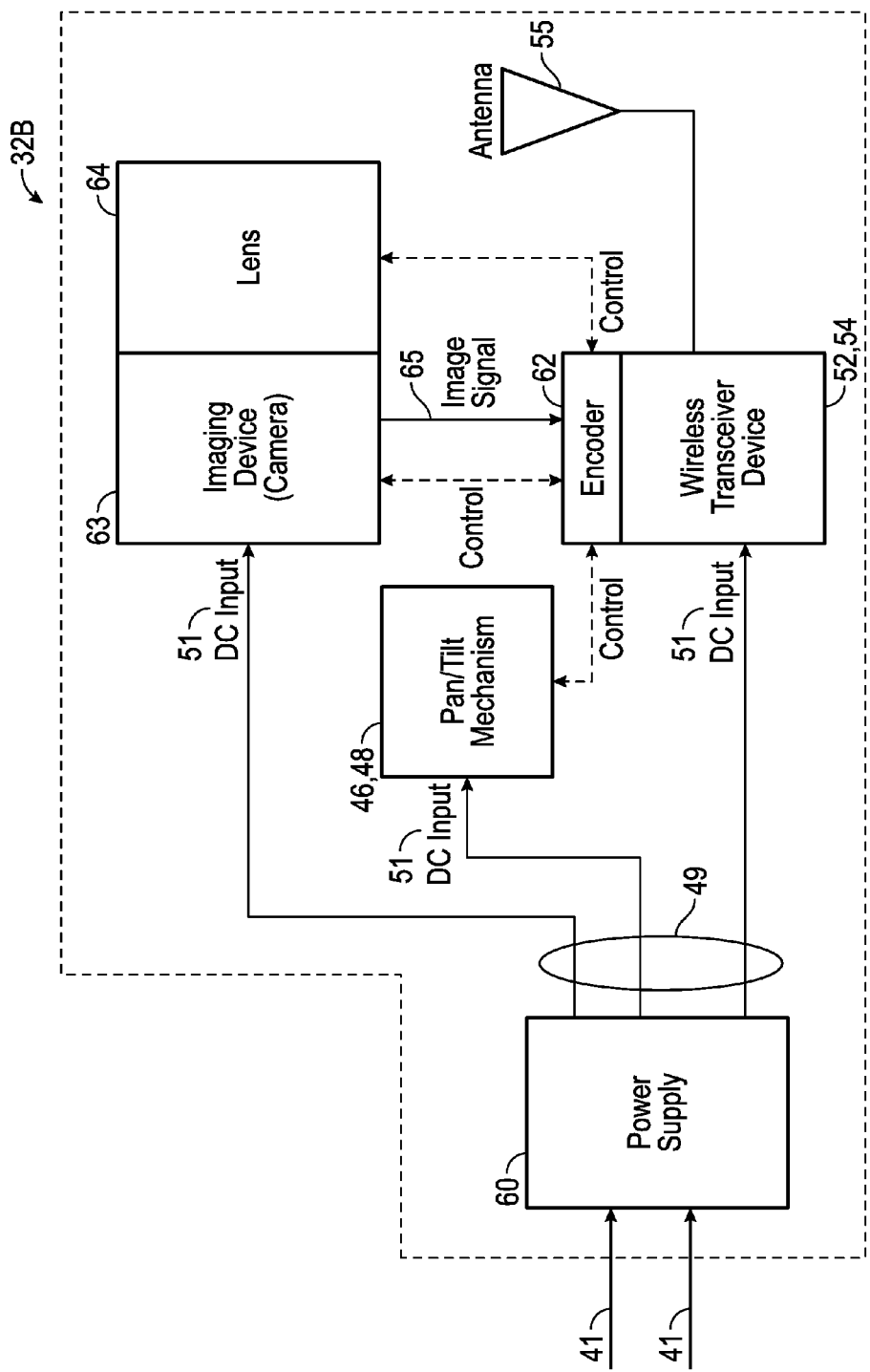
FIG. 7B is block diagram of a modified camera module which the dual camera of FIG. 7A is replaced by a single lens camera.

FIG. 7B illustrates a modified surveillance camera system or module 32B which may replace camera module 32 in another embodiment of the system 16. Some components of the system of FIG. 7B are identical to those of the camera system 32, and like references are used for like parts as appropriate. The main difference is the replacement of the dual head camera 42 of the previous embodiment with a single camera 63 having an adjustable zoom lens 64. As in the previous embodiment, AC inputs 41 of FIG. 6 are connected to power supply 60 which provides DC power input 51 via slip ring 49 to the camera, the pan/tilt mechanism 46, 48, and the wireless transmission and receiving device. Encoder module 62 provides control signals received via telemetry receiver 52 to the pan/tilt mechanism to control pan and tilt angles of the camera, and to the camera for adjusting zoom of the lens 64 in order to enlarge an image of interest. The image signal 65 is transmitted via encoder 62 to the remote monitoring location via a bi-directional data link comprising wireless transceiver 52, 54 and antenna 55.

Figure 9:
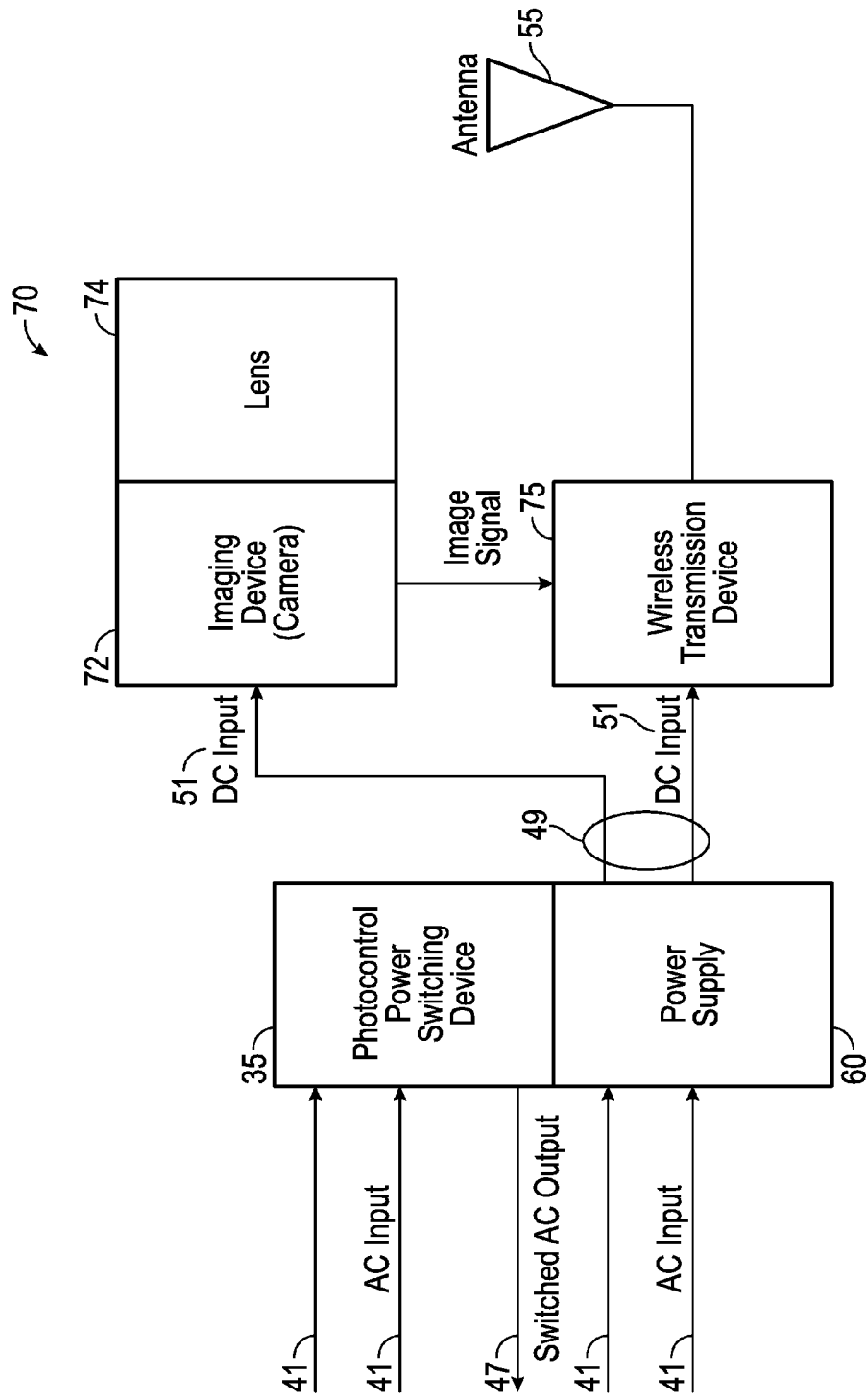
FIG. 9 is a block diagram of another embodiment of the combined surveillance camera and photosensor system in which the camera is manually positioned.

FIG. 9 is a block diagram of a modified surveillance camera system 70 in which the pan/tilt camera of the first and second embodiments is replaced by a simpler, manually positioned camera 72 with a fixed lens 74. The bi-directional data link is replaced by a wireless transmission device 75 connected to antenna 55. The components of the system are otherwise identical to the previous embodiment, and like reference numbers are used for like parts as appropriate. The components are enclosed in the same outer housing as illustrated in FIGS. 2 to 5, but the camera and top cap are manually rotatable to a selected fixed monitoring position prior to locking in place, rather than being controlled remotely via a pan-tilt mechanism and data link. This alternative is simpler and less expensive than the previous embodiment, and requires no back or receiver channel. It may be used where surveillance of only a single location or in a single direction is required, for example for traffic monitoring or monitoring of a specific street area known for criminal activity.

In each of the above embodiments, the camera is on at all times and power for the internal components of the surveillance camera system is supplied from the existing AC power source of the lighting fixture, requiring no external cables to power the system. The combined surveillance camera and photosensor unit simply replaces the existing light sensor or photo control sensor unit of an existing public, commercial, or residential lighting fixture, replacing the function of the existing light sensor in turning the lighting fixture on and off, while also providing a concealed surveillance camera system drawing power from the existing photo control sensor power supply. This requires no modification to the existing light fixture, and avoids the need to mount a large and highly visible surveillance camera system on the pole or other light fixture support. It also requires no additional lines for connecting the surveillance camera system to the existing power source, unlike prior art light fixture mounted surveillance cameras.

The surveillance camera system may be fixed with a manually adjusted camera and lens or may have a fully articulated camera as in the first two embodiments which can be remotely positioned and controlled wirelessly via a microwave link or bi-directional wireless data link. Any type of surveillance camera may be used in this system, including standard video, high definition or megapixel sensors, with a single camera, dual camera heads, fixed or variable zoom lenses which can be either manually or remotely controlled over the associated wireless transmission system. The wireless system may transmit images via a microwave transmission and reception system, over WIFI, or through a commercial cellular wireless network.

This system provides a simple and effective means to add a surveillance camera to any location, and can be rapidly mounted to virtually any device that is photosensor controlled based on ambient light level, without requiring removal and replacement of the existing device or lighting fixture or extra mounting fixtures or power supplies for the surveillance system. All that is required is an outer housing large enough to contain both the photosensor control module and the surveillance camera module and having a base portion designed for making mechanical and electrical engagement in a matching photosensor unit mounting recess of the particular light fixture. Multiple surveillance camera systems may be readily installed in place of standard photosensor units of existing public or private lighting fixtures, allowing easy remote monitoring of an area and tracking of any suspicious activity. Individuals in the vicinity are unlikely to notice the camera in view of its low profile and positioning in an existing photosensor mounting recess, so there is little or no change in appearance.

The photosensor module of the above embodiments replaces the existing, single photosensor module of a photocontrolled public or private light fixture. The single photosensor of existing light fixture photosensor units must be aligned to face north so as to avoid inaccuracy in reading of the ambient light at sunrise or sunset. The four equally spaced photosensors of module 35 of the combined photosensor and camera unit described above eliminate the need for precise positioning of the module on installation, making installation faster and easier since no adjustment is needed to ensure that a photosensor points north or in any specific direction. Instead, the outputs from all four photosensors can be analyzed and averaged to provide an ambient light measurement for use in controlling operation of the light source. The optional, upwardly directed photosensor 37 provides an additional light measurement for increased accuracy.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

I claim:

1. A combined surveillance camera and photosensor system for replacing a photosensor unit controlling actuation of at least one light source of an existing outdoor public lighting fixture, comprising:
  an outer housing having at least a first window, a second window, and a base portion configured for releasable mating engagement in a photosensor unit seat of an outdoor lighting fixture after removal of an existing photosensor unit;
  the base portion having at least two electrical contacts configured for mating engagement with corresponding electrical contacts in the seat when the base portion is mounted in the seat;
  a power switching control module and a surveillance camera module mounted in the outer housing;
  the power switching control module having a controller and at least one photosensor aligned with the first window to detect ambient light level outside the housing, the at least one photosensor having an output connected to the controller which varies based on detected ambient light level, and the controller being configured to control connection between the electrical contacts in the base portion to connect a power source for the lighting fixture to at least one light source in the fixture at a location separate from the combined surveillance camera and photosensor system when the detected ambient light level is below a predetermined minimum light level and to provide power to the surveillance camera module independent of the detected ambient light level; and
  the surveillance camera module comprising a surveillance camera having at least one lens facing the second window.

2. The system of claim 1, wherein the outer housing has a central axis, a first part including the base portion, and a second part including the second window, the second part being rotatably mounted on the first part for rotation about the central axis, and at least the surveillance camera module being mounted in the second part of the housing.

3. The system of claim 2, wherein the power switching control module is mounted in the first part of the housing between the base portion and the rotatably mounted surveillance camera module, whereby the power switching control module remains stationary while the camera module rotates to scan the surrounding area, and a drive motor for rotating the second part of the housing relative to the first part of the housing, the surveillance camera module further comprising a camera controller which is configured to control the azimuth position of the surveillance camera by controlling actuation and drive direction of the drive motor.

4. The system of claim 3, further comprising a rotary electrical connection between the power switching control module and the surveillance camera module.

5. The system of claim 4, wherein the surveillance camera is a remotely positionable camera having a transmitter for transmitting images received by the camera to a remote location and a receiver for receiving a telemetry control input including camera positioning information from the remote location.

6. The system of claim 5, wherein the surveillance camera module further comprises an azimuth sensor which monitors azimuth position of the surveillance camera and has an azimuth position feedback output, and the camera controller is configured to control azimuth position of the surveillance camera based on the azimuth position feedback output of the azimuth sensor and a telemetry control input.

7. The system of claim 6, wherein the surveillance camera module has a base secured to the second part of the housing, the surveillance camera is pivotally mounted on the base for rotation about a camera tilt axis, and the surveillance camera module further comprises an elevation drive motor which controls tilt of the camera about the tilt axis for viewing of areas surrounding the light fixture over a predetermined range of tilt angles, the camera controller being configured to control the elevation drive motor to control elevation angle of the camera based on the telemetry control input.

8. The system of claim 1, further comprising a power supply in the housing connected to the power source for the lighting fixture when the base is secured in the photosensor unit seat, the surveillance camera module and power switching control module being connected to the housing power supply, whereby the existing AC power source of the lighting fixture provides power for operation of the surveillance camera module and power switching control module.

9. A combined surveillance camera and photosensor system for replacing a photosensor unit of an existing lighting fixture, comprising:
an outer housing having at least a first window, a second window, and a base portion configured for releasable mating engagement in a photosensor unit seat of a lighting fixture after removal of an existing photosensor unit;
the base portion having at least two electrical contacts configured for mating engagement with corresponding electrical contacts in the seat when the base portion is mounted in the seat;
a power switching control module and a surveillance camera module mounted in the outer housing;
the power switching control module having a controller and at least one photosensor aligned with the first window to detect ambient light level outside the housing, the at least one photosensor having an output connected to the controller which varies based on detected ambient light level, and the controller being configured to control connection between the electrical contacts in the base portion to connect a power source for the lighting fixture to at least one light source in the fixture when the detected ambient light level is below a predetermined minimum light level;
the surveillance camera module comprising a surveillance camera having at least one lens facing the second window; and
wherein the power switching control module includes a plurality of photosensors arranged at spaced intervals in a ring around the power switching control module and facing outwards, and the housing has a plurality of first windows equal in number to the number of photosensors and arranged in a ring around the housing with each first window aligned with a respective photosensor, the photosensor outputs being connected to the controller and the controller being configured to determine the average ambient light level based on the photosensor outputs and to control switching on of the light source in the lighting fixture based on the average ambient light level.

10. The system of claim 9, wherein the outer housing has an outer end and the at least one additional photosensor is located in the outer end of the housing in alignment with the additional window, the output of the additional photosensor being connected to the controller for use in determining the average ambient light level.

11. The system of claim 2, wherein an additional window is located in the outer end of the housing, and the at least one photosensor comprises a photosensor located in the second part of the housing in alignment with the additional window and connected to the controller in the first part of the housing.

12. The system of claim 1, wherein the surveillance camera is a remotely positioned, microwave transmission dual head camera.

13. The system of claim 1, wherein the housing contains no light source for illumination of areas outside the housing and the base portion is configured for mounting in a photosensor unit seat of a pole mounted public lighting fixture actuated by an AC power source.

14. The system of claim 1, wherein the base portion of the outer housing comprises a twist lock mechanical and electrical connection matching a twist lock mechanical and electrical connection of an existing removable photosensor control unit of a light fixture.

15. The system of claim 2, wherein the base portion has at least three electrical contacts comprising a pair of alternating current (AC) power input contacts configured for electrical connection to AC power contacts in a light fixture mounting recess of an existing light fixture which are connected to an existing light fixture AC power supply, and a third electrical contact comprising a light source output contact configured for connection to a contact in the light fixture mounting recess which is connected to at least one light source in the existing light fixture, and the power switching control module is configured to connect a switched AC power output to the third electrical contact to turn on the light source in the light fixture when the detected ambient light level is below a predetermined minimum value.

16. The system of claim 15, further comprising a power supply module in the housing connected to the AC power input contacts in the base portion of the housing and having a power supply output connected to the surveillance camera module in the second part of the housing, whereby power is provided to the surveillance camera from the light fixture power supply independent of the detected ambient light level.

17. A method of installing and operating a combined photosensor and surveillance camera unit on an existing public lighting fixture having a photosensor control unit, comprising:

removing an existing photosensor control unit from a recessed seat in a public lighting fixture housing to expose a first set of electrical contacts comprising power supply contacts connected to an existing AC power source of a public lighting fixture and at least one light source contact connected to a light source in the lighting fixture which is separate from the recessed seat;

securing a mating base part of a housing of a combined photosensor and surveillance camera unit in the recessed seat of the lighting fixture, the mating base part having a base portion of shape and dimensions matching those of a corresponding base portion of the existing photosensor control unit, whereby power source and light source contacts in the mating base portion of the housing are connected to a power switching control module in the base part of the housing and are engaged with corresponding contacts in the recessed seat;

using at least one processor in the power switching control module to perform steps comprising:

providing power from the AC power source of the lighting fixture to a surveillance camera positioned in the housing and facing a second window in the housing;

monitoring an ambient light level output signal from at least one photosensor in the housing facing a first window in the housing;

connecting a power supply of the power switching control module having inputs connected to the power supply contacts of the recessed seat to the light source contact in the recessed seat when the ambient light level output signal is equal to or less than a predetermined minimum value; and disconnecting the power supply from the power supply contacts when the ambient light level output signal is greater than the predetermined minimum value.

18. The method of claim 17, further comprising receiving input signals for controlling pan and tilt of the surveillance camera at a surveillance camera module in the housing from a remote control unit, and rotating a rotatable part of the housing containing the surveillance camera relative to the mating base part of the housing having a base portion secured in the recessed seat of the lighting fixture housing and containing the at least one photosensor and a power switching control unit to pan the surrounding area with the camera.

19. The system of claim 6, wherein the second, rotatable part of the outer housing is cylindrical and has a lower portion which is telescopically engaged over an upper portion of the first part of the housing, and the second window is elongated in a direction parallel to the central axis and of predetermined length to accommodate the range of camera tilt angles.

20. The system of claim 1, wherein the outer housing is of a cylindrical shape and has a height greater than a height of the photosensor unit to be replaced.

* * * * *